United States Patent
Bowerman et al.

(10) Patent No.: US 11,213,775 B2
(45) Date of Patent: Jan. 4, 2022

(54) FUEL FILTER CARTRIDGES WITH AUTOMATED AIR-BLEEDING INTERNAL FEATURES

(71) Applicant: CUMMINS FILTRATION IP, INC., Columbus, IN (US)

(72) Inventors: Jeff A. Bowerman, Cookeville, TN (US); Aarol Duane Bright, Monterey, TN (US); Peter K. Herman, Stoughton, WI (US); Mark V. Holzmann, Stoughton, WI (US); Pravin Shantinath Kadam, Maharashtra (IN); Eric Roysdon, Jamestown, TN (US)

(73) Assignee: CUMMINS FILTRATION IP, INC., Columbus, IN (US)

(*) Notice: Subject to any disclaimer, the term of this patent is extended or adjusted under 35 U.S.C. 154(b) by 100 days.

(21) Appl. No.: 16/648,594

(22) PCT Filed: Sep. 21, 2018

(86) PCT No.: PCT/US2018/052222
§ 371 (c)(1),
(2) Date: Mar. 18, 2020

(87) PCT Pub. No.: WO2019/060727
PCT Pub. Date: Mar. 28, 2019

(65) Prior Publication Data
US 2020/0215469 A1  Jul. 9, 2020

Related U.S. Application Data

(60) Provisional application No. 62/562,700, filed on Sep. 25, 2017.

(51) Int. Cl.
 *B01D 36/00* (2006.01)
 *B01D 29/15* (2006.01)
 *F02M 37/50* (2019.01)

(52) U.S. Cl.
 CPC .......... *B01D 36/001* (2013.01); *B01D 29/15* (2013.01); *F02M 37/50* (2019.01);
(Continued)

(58) Field of Classification Search
 CPC .......... B01D 29/15; B01D 2201/0415; B01D 2201/295; B01D 2201/34; B01D 36/001; F02M 37/50
 See application file for complete search history.

(56) References Cited

U.S. PATENT DOCUMENTS 4,529,663 A * 7/1985 Lancaster ............ C09K 3/1028
                                                      428/450
5,489,384 A   2/1996 Janik et al.
(Continued)

OTHER PUBLICATIONS

International Search Report for PCT Application No. PCT/US2018/052222, dated Dec. 10, 2018, pp. 1-2.
(Continued)

*Primary Examiner* — Waqaas Ali
(74) *Attorney, Agent, or Firm* — Foley & Lardner LLP

(57) ABSTRACT

A filter assembly includes a housing having an outer cavity and an inner cavity, and a gasket disposed within the housing. The gasket includes an inner surface, an outer surface, and a vent passage. The gasket forms a first seal with a central tube at the inner surface. The central tube extends into the inner cavity and includes an opening. A filter element is positioned within the housing and includes a filter media configured to filter a fluid and an endcap including an annular tab portion that forms a second seal with the outer surface of the gasket when the filter element is positioned in an operating position within the housing.

(Continued)

The vent passage circumvents the first seal and the second seal, allowing air to flow from the inner cavity of the housing to the opening in the central tube.

21 Claims, 12 Drawing Sheets

(52) U.S. Cl.
CPC ............... *B01D 2201/0415* (2013.01); *B01D 2201/295* (2013.01); *B01D 2201/34* (2013.01)

(56) References Cited

U.S. PATENT DOCUMENTS

| | | |
|---|---|---|
| 7,147,110 B2 | 12/2006 | Clausen et al. |
| 7,717,092 B2 | 5/2010 | Wieczorek |
| 2003/0226800 A1* | 12/2003 | Brown .................. B01D 35/31 |
| | | 210/497.01 |
| 2007/0107601 A1 | 5/2007 | Laverdiere et al. |
| 2008/0210618 A1 | 9/2008 | Kiedaisch et al. |
| 2009/0230063 A1 | 9/2009 | Hawkins et al. |
| 2011/0127210 A1* | 6/2011 | Suzuki .................. B01D 29/19 |
| | | 210/438 |
| 2013/0068702 A1 | 3/2013 | Allen et al. |

OTHER PUBLICATIONS

Written Opinion for PCT Application No. PCT/US2018/052222, dated Dec. 10, 2018, pp. 1-5.

* cited by examiner

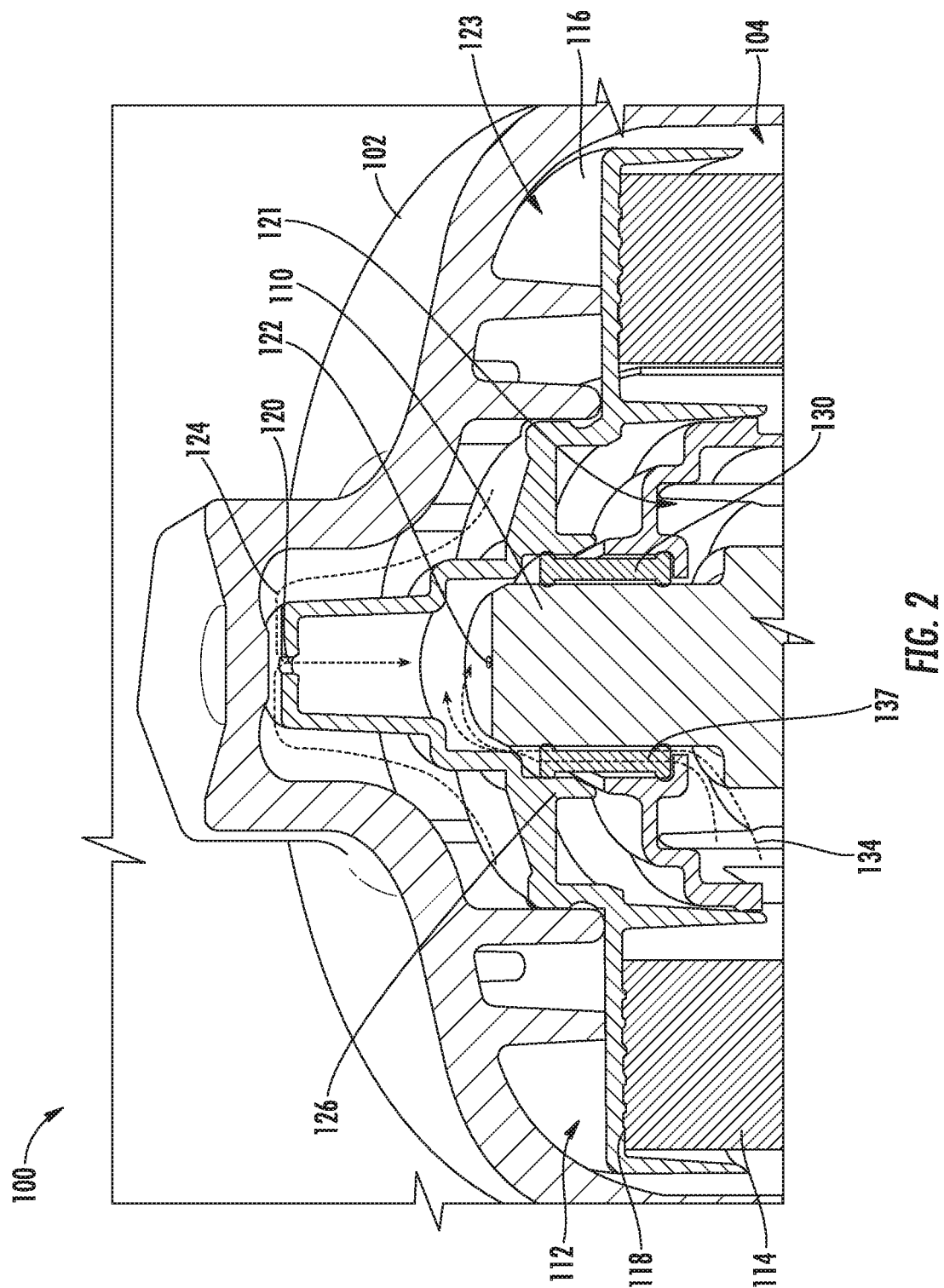

FUEL FILTER CARTRIDGES WITH AUTOMATED AIR-BLEEDING INTERNAL FEATURES

CROSS-REFERENCE TO RELATED PATENT APPLICATIONS

This application is the U.S. national stage of PCT Application No. PCT/US2018/052222, filed on Sep. 21, 2018, which claims priority to U.S. Provisional Patent Application No. 62/562,700 filed on Sep. 25, 2017, the contents of which are herein incorporated by reference in their entirety and for all purposes.

TECHNICAL FIELD

This disclosure relates to filter element for use in filtering fluids such as fuel.

BACKGROUND

For heavy-duty diesel engines where achieving maximum fuel pressure is desired, any trapped air within large fuel housings can pose a problem. Air can become trapped within the fuel housing in a number of ways, including as a result of a new filter element being installed in the housing and air entrained in fuel entering the fuel filter housing.

Manual external or internal air-bleed valves have been developed to purge air outside of the filter housing. Various automatic air bleeding fuel filter designs are also known. The use of external air-bleed valves can present additional possibilities of functional failure where fuel-leaks could occur. Moreover, to manually bleed air out, some amount of fuel can spill out of the housing, posing safety risks to the operator. The same safety risks apply to draining the fuel manually out of the housing during filter replacement.

In addition, existing venting features, which include providing a small vent hole on an endcap of a filter assembly, only allows priming of the air from an outer side of the fuel filter.

SUMMARY

One embodiment relates to a filter assembly. The filter assembly includes a housing having an outer cavity and an inner cavity, and a gasket disposed within the housing. The gasket includes an inner surface, an outer surface, and a vent passage. The gasket is configured to form a first seal with a central tube at the inner surface. The central tube extends into the inner cavity and includes an opening. A filter element is positioned within the housing and includes a filter media configured to filter a fluid and an endcap including an annular tab portion that forms a second seal with the outer surface of the gasket when the filter element is positioned in an operating position within the housing. The vent passage circumvents the first seal and the second seal, allowing air to flow from the inner cavity of the housing to the opening in the central tube.

Another embodiment relates to a filter assembly. The filter assembly includes a housing having an outer cavity and an inner cavity, and a gasket disposed within the housing. The gasket is configured to form a first seal with the outer surface of a central tube, the central tube including an opening formed in a top surface, and a vent passage formed on the outer surface. A filter element is positioned within the housing and includes a filter media configured to filter a fluid and an endcap including an annular tab portion that forms a second seal with the gasket when the filter element is positioned in an operating position within the housing. The vent passage circumvents the first seal and the second seal allowing air to flow from the inner cavity of the housing to the opening in the central tube.

Still another embodiment relates to a filter assembly. The filter assembly includes a housing having an outer cavity and an inner cavity, a central tube extending into the inner cavity, and a porous gasket disposed within the housing. The porous gasket is disposed within the housing and surrounds and is configured to form a seal with a central tube extending into the inner cavity, the central tube including an opening. A filter element is positioned within the housing and includes a filter media configured to filter a fluid and an endcap sealed with the porous gasket when the filter element is positioned in an operating position within the housing. The porous gasket allows air to flow from the inner cavity of the housing through the porous gasket and to the opening in the central tube.

Yet another embodiment relates to a filter assembly. A gasket comprises an inner surface, an outer surface, and a vent passage. The gasket is configured to form a first seal with a central tube at the inner surface. The central tube extends into an inner cavity of a housing. The central tube includes an opening. A filter element comprises a filter media and an endcap. The filter media is configured to filter a fluid. The endcap includes an annular tab portion that forms a second seal with the outer surface of the gasket. The vent passage circumvents the first seal and the second seal, allowing air to flow from the inner cavity of the housing to the opening in the central tube.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE FIGURES

FIG. 2 shows a cross-sectional view of a portion of the filter assembly of FIG. 1.

DETAILED DESCRIPTION

Referring to the figures generally, a filtration system is shown. The filtration system includes a filter housing having a central tube (e.g., a standpipe) and a replaceable filter element. The filtration system includes a gasket that plugs a passage from the dirty side of the filter element to the clean side of the filter element when the filter element is installed over the central tube in an operational position. The gasket includes a vent passage or channel extending through the gasket. The vent passage or channel allows air from the inner cavity of the filter housing to be purged therethrough, thereby fluidly coupling the inner cavity of the filter housing with an air vent on the central tube, which is connected to a fuel tank. Allowing purging of air in this way may improve the starting process of an engine used with the system. For example, the starting time of the engine may be cut approximately in half over engines using conventional filtration systems. Furthermore, the filtration system described herein reduces the amount of lingering air pockets within the inner cavity of the filter housing, which may hinder the pump from developing the necessary pressure to efficiently start the engine.

Figure 1:
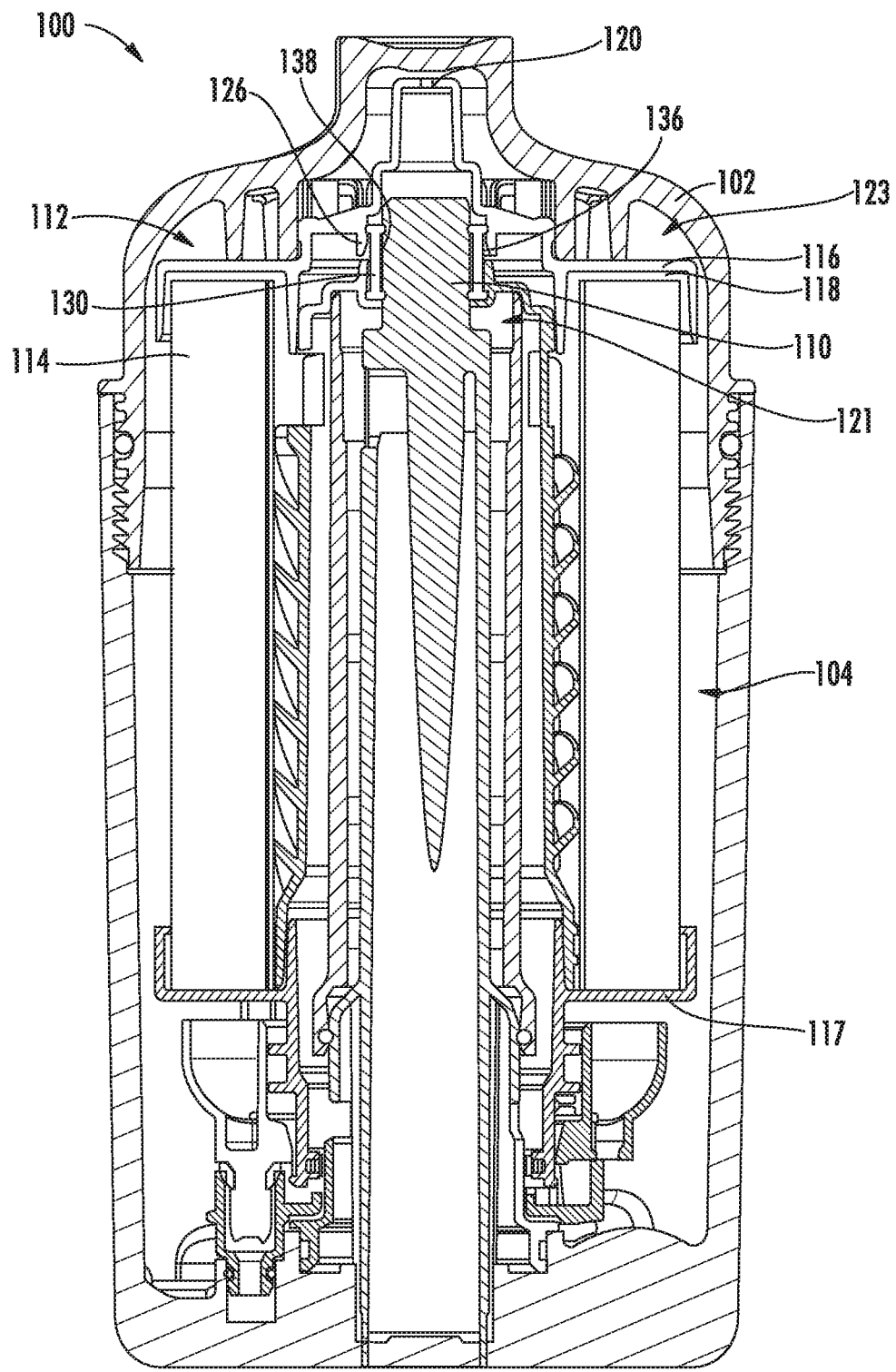
FIG. 1 shows a cross-sectional view of a filter assembly according to an example embodiment.

Referring to FIGS. 1-2, a cross-sectional view of a filter assembly 100 and a portion of a filter assembly 100 are shown, respectively. The filter assembly 100 includes a filter housing 102. The filter housing 102 defines a substantially cylindrical cavity 104. A central tube 110 (e.g., a standpipe mounted on a filter head of an engine) is received within the cavity 104. A cylindrical filter element 112 is removably received in the cavity 104 and over the central tube 110. The filter element 112 includes a filter media 114 arranged in a cylindrical manner and positioned between a first endcap 116 and a second endcap 117.

The first endcap 116 is attached to a first end 118 of the filter media 114 using any suitable attachment method, for example using an adhesive or embedding or potting the first end 118 into the first endcap 116, which can be made of plastic or metal. The first endcap 116 is a closed endcap (with the exception of the vent passage discussed herein) that seals the dirty side of the filter media 114 (the side of the filter media 114 facing the housing wall) from the clean side of the filter media 114 (the side of the filter media 114 facing the central tube 110). The second endcap 117 is an open endcap such that the filter element 112 can be received over the central tube 110.

The central tube 110 extends upwardly into the interior of the filter housing 102. The central tube 110 includes an opening 122 (shown in FIG. 2) configured to allow fluid communication between the cavity 104 of the filter housing 102 to a fuel tank (not shown) or other fuel storage location through which air and/or fuel mixed with air is returned to the fuel tank after being vented from the fuel filter. Fuel can also drain through the opening 122 back to the fuel tank when the filter element 112 is lifted upward so that the fuel filter assembly 100 can auto-drain during filter element changes.

The filter housing 102 is divided by the first endcap 116 into an inner cavity 121 and an outer cavity 123. The inner cavity 121 is defined by the underside of the first endcap 116, the inner wall of the filter housing 102, and the outer surface of the central tube 110. The outer cavity 123 is defined by the topside of the first endcap 116 and the inner wall of the filter housing 102. The first endcap 116 includes an air vent passage 120 extending therethrough, which permits venting of air through the first endcap 116 (as shown by outer side air flow arrow 124 in FIG. 2) from an outer cavity 123. An annular tab portion 126 formed on the first endcap 116 extends into the inner cavity 121 and surrounds the central tube 110. A cylindrical gasket 130 is disposed between the central tube 110 and the annular tab portion 126 to seal the central tube 110 and the annular tab portion 126 of the first endcap 116.

Figure 3A:
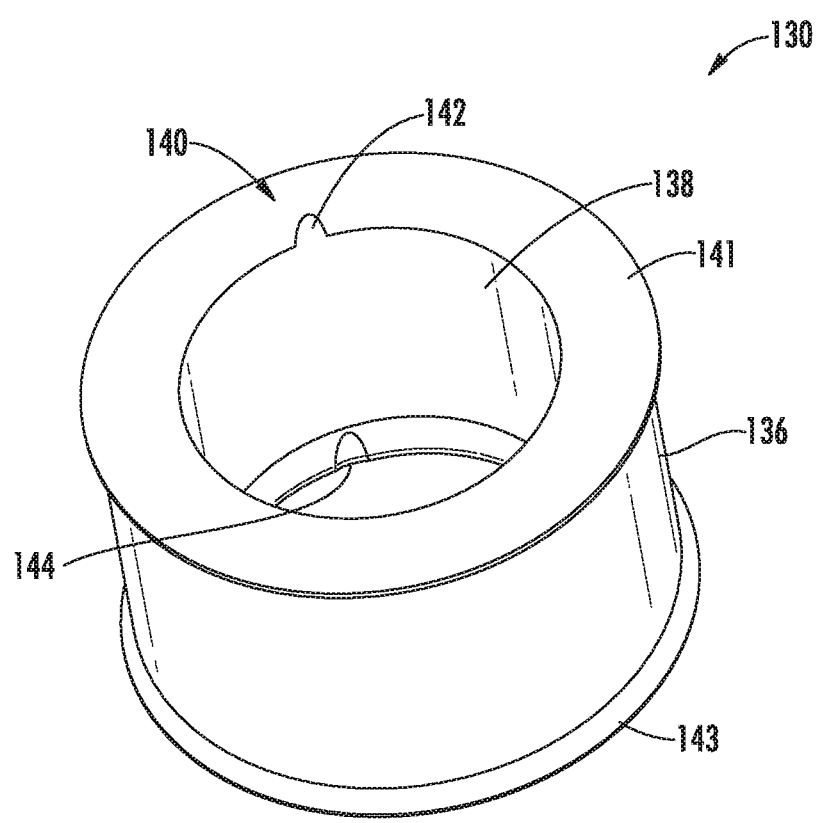
FIG. 3A shows a perspective view of a gasket for use with the filter assembly of FIG. 1.
Figure 3B:
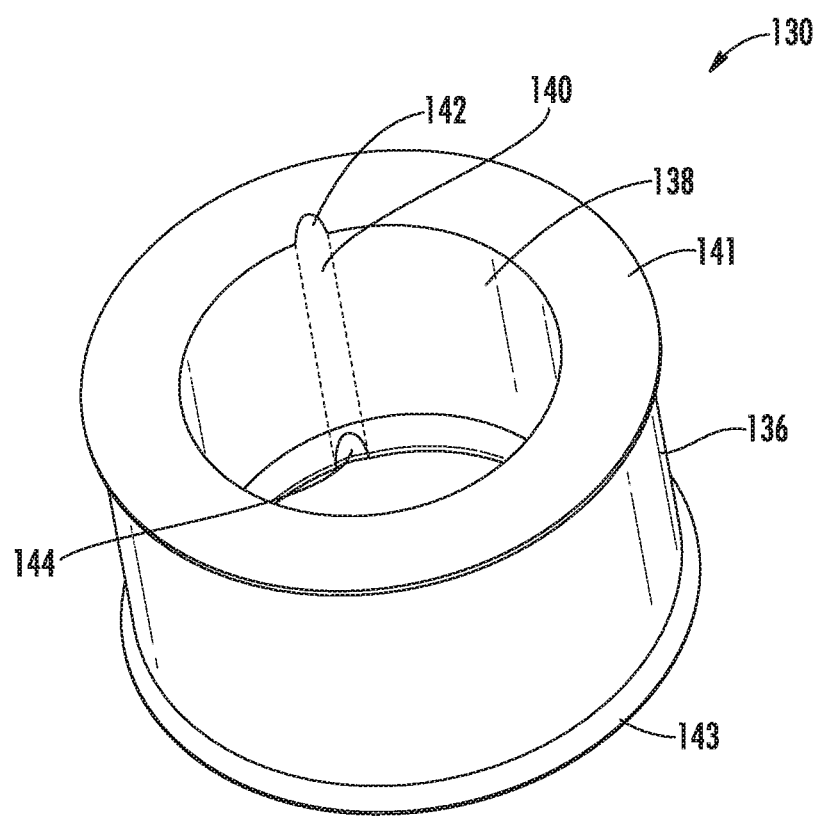
FIG. 3B shows a perspective view of a gasket for use with the filter assembly of FIG. 1.

Referring to FIGS. 3A-3B, the cylindrical gasket 130 is shown according to example embodiments. As shown, the gasket 130 includes an outer surface 136 and an inner surface 138. The gasket 130 further includes a top annular ring 141 and a bottom annular ring 143, both of which extend radially past the outer surface 136 and the inner surface 138. The gasket 130 includes an air vent passage 140 (e.g., channel, groove, path, etc.). Referring to FIG. 3A, the air vent passage 140 is formed by two openings 142, 144 formed on the inner surface 138 of the gasket 130. The openings 142, 144 are formed on an inner side of the top annular ring 141 and the bottom annular ring 143, respectively. The openings 142, 144 depicted in FIGS. 3A-3B are generally semi-circular in shape. In other embodiments, the openings 142, 144 may be otherwise shaped. In other embodiments, for example as shown in FIG. 3B, the air vent passage 140 is formed by a channel extending along the inner surface 138 of the gasket 130 and through the top annular ring 141 and bottom annular ring 143.

Figure 4:
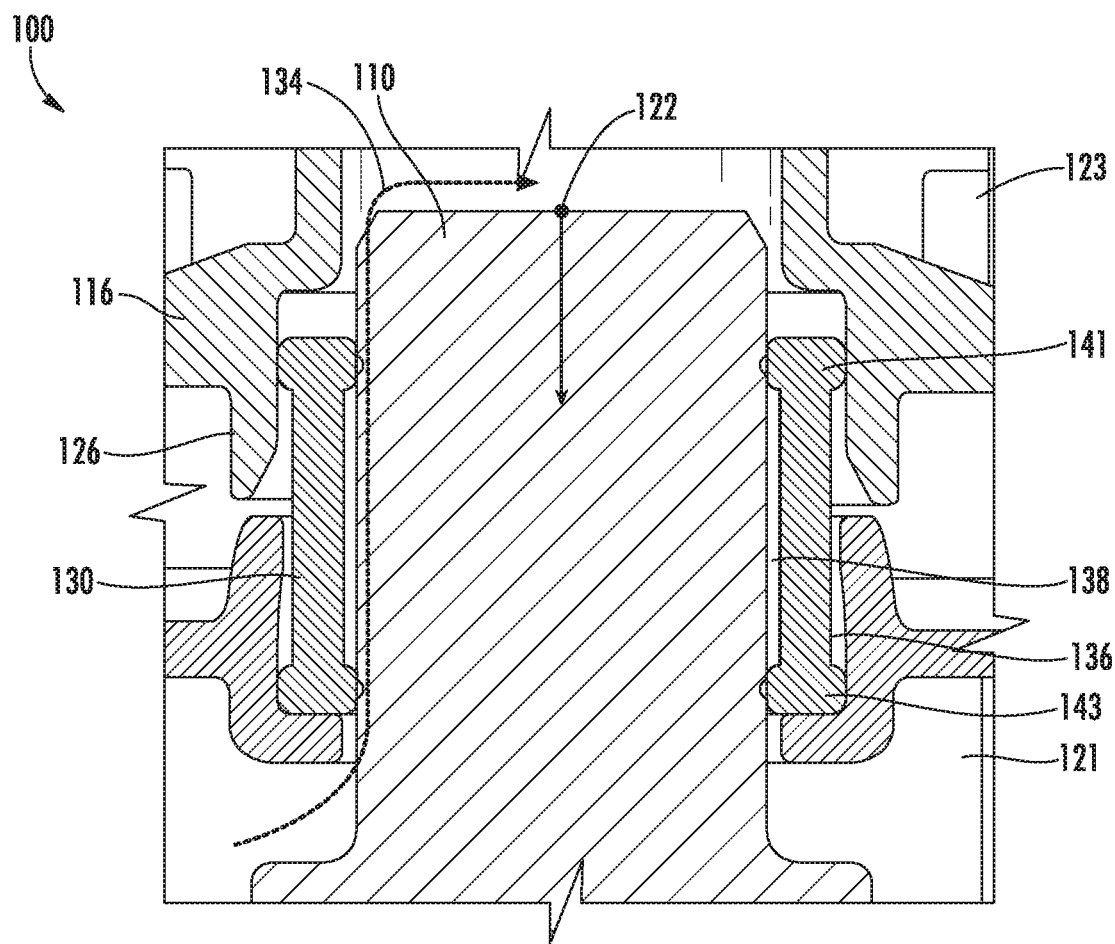
FIG. 4 shows a close-up cross-sectional view of the filter assembly of FIG. 1.

FIG. 4 shows a close-up cross-sectional view of the filter assembly 100 near the cylindrical gasket 130. As shown, a portion of the outer surface 136 (e.g., at the top annular ring 141) interfaces with the annular tab portion 126 of the first endcap 116, while the inner surface 138 of the gasket 130 interfaces with the central tube 110. The air vent passage 140 passes between the gasket 130 and the central tube 110. The air vent passage 140 allows for venting of air from the inner cavity 121 toward the opening 122 of the central tube 110. Thus, in addition to the venting of air through the first endcap 116 as shown by outer side air flow arrow 124 in FIG. 2, venting as shown by inner side air flow arrow 134 (e.g., from the inner cavity 121 between gasket 130 and central tube 110 toward opening 122) is also permitted. In this way, air that may be trapped within the inner cavity 121 is purged through the air vent passage 140.

Figure 5:
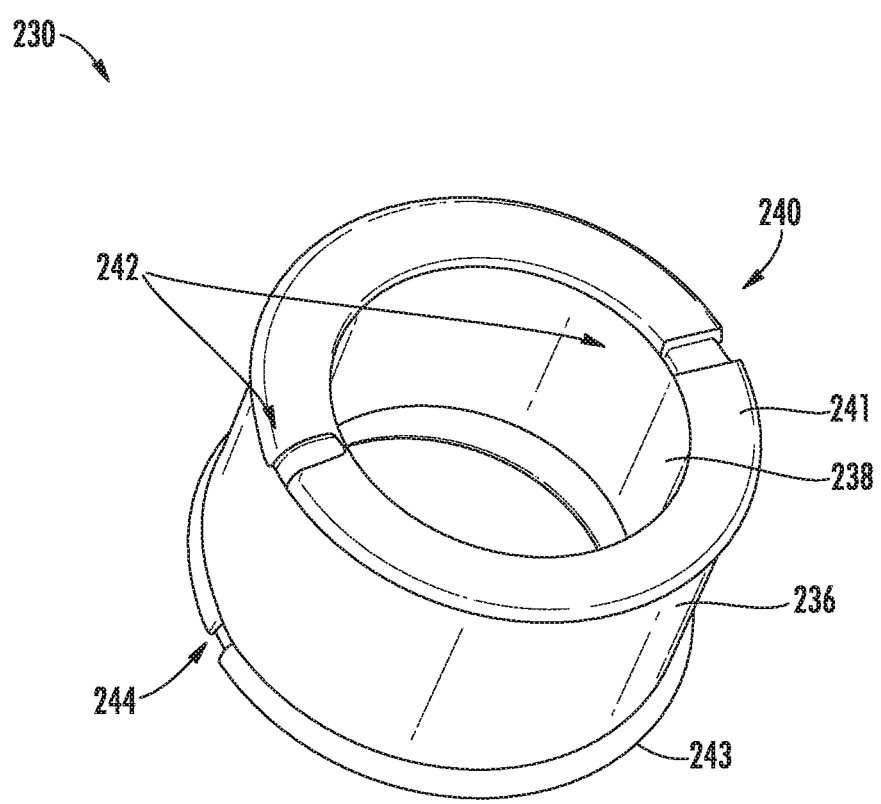
FIG. 5 shows a perspective view of a gasket for use with the filter assembly of FIG. 1.

Referring to FIG. 5, a cylindrical gasket 230 is shown according to another example embodiment. The cylindrical gasket 230 includes an outer surface 236 and an inner surface 238. The gasket 230 further includes a top annular ring 241 and a bottom annular ring 243, both of which extend laterally past the outer surface 236 and the inner surface 238 of the gasket 230. The gasket 230 includes an air vent passage 240 (e.g., channel, groove, path). The air vent passage 240 is formed by a horizontal slot 242 and a vertical slot 244. The horizontal slot 242 extends through the top annular ring 241 in a direction substantially perpendicular with the outer surface. The vertical slot 244 extends longitudinally through the bottom annular ring 243 in a direction substantially parallel with the outer surface 236.

Figure 6:
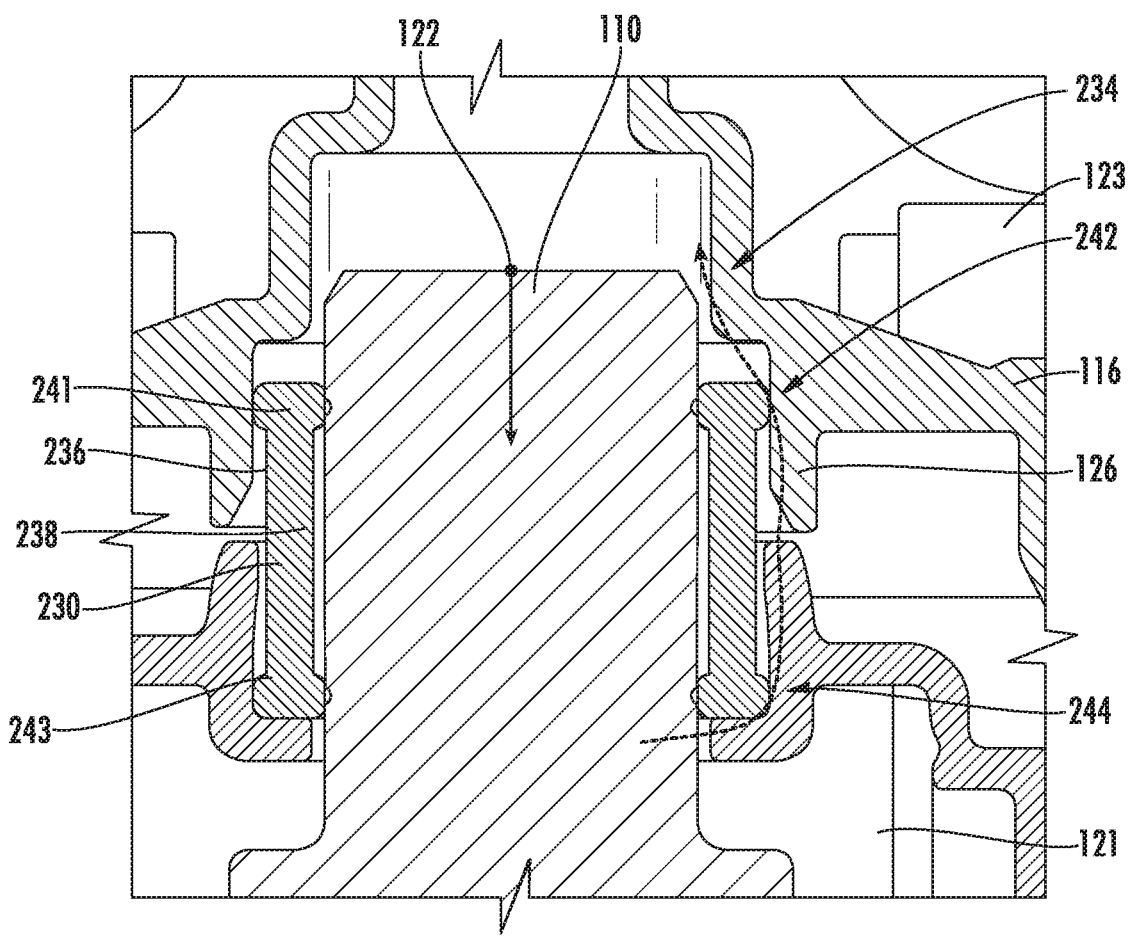
FIG. 6 shows a close-up cross-sectional view of the filter assembly of FIG. 1 including the gasket of FIG. 5.

FIG. 6 shows a close-up cross-sectional view of the filter assembly 100 near the cylindrical gasket 230. As shown, a portion of the outer surface 236 (e.g., at the top annular ring 241) interfaces with the annular tab portion 126 of the first endcap 116, while the inner surface 238 of the gasket 230 interfaces with the central tube 110. The air vent passage 240 formed by the horizontal slot 242 and the vertical slot 244 passes between the outer side of the gasket 230 and the inner side of the annular tab portion 126 of the first endcap 116. The air vent passage 240 allows for venting of air from the inner cavity 121 toward the opening 122 of the central tube 110. The air flows from the inner cavity 121 through the vertical slot 244 on the bottom annular ring 243 and along the outer surface 238 of the gasket 230 toward the top annular ring 241 of the gasket 230, where the air flows through the horizontal slot 242 and toward the opening 122 of the central tube 110. Thus, in addition to the venting of air through the first endcap 116 as shown by outer side air flow arrow 124 in FIG. 2, venting as shown by inner side air flow arrow 234 (e.g., from the inner cavity 121 between the gasket 130 and the first endcap 116 toward opening 122) is also permitted. In this way, air that may be trapped within the inner cavity 121 is purged through the air vent passage 240.

Figure 7:
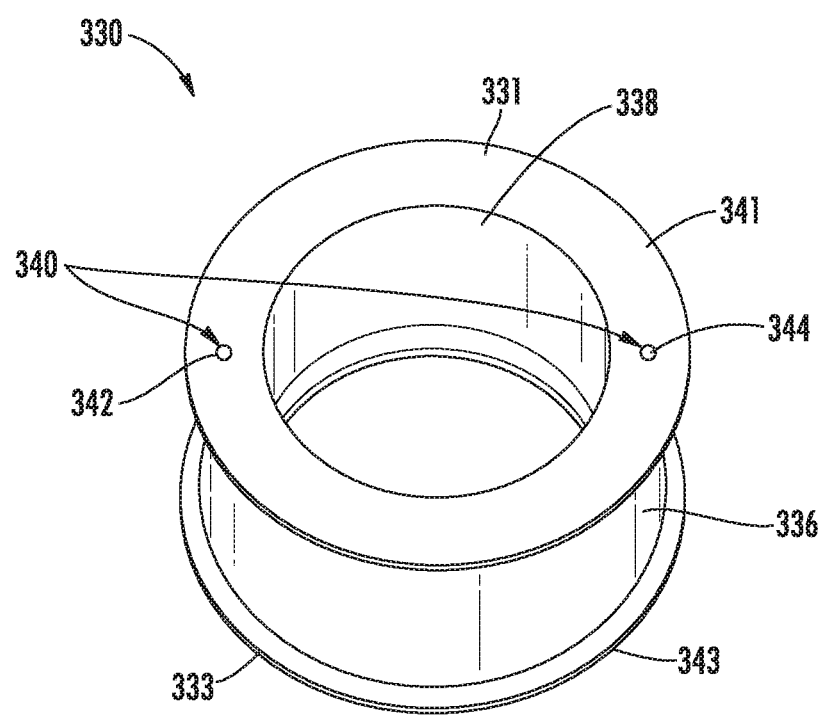
FIG. 7 shows a perspective view of a gasket for use with the filter assembly of FIG. 1.

Referring to FIG. 7, a cylindrical gasket 330 is shown according to another example embodiment. The cylindrical gasket 330 includes an outer surface 336, an inner surface 338, a top surface 331, and a bottom surface 333. The gasket 330 further includes a top annular ring 341 and a bottom annular ring 343, both of which extend laterally past the outer surface 336 and the inner surface 338 of the gasket 330. The gasket 330 includes one or more air vent passages 340 (e.g., channels, through-holes, paths). The air vent passages 340 are formed by through-holes 342, 344. The through-holes 342, 344 extend from the top surface 331 of the gasket 330 to the bottom surface 333. The through-holes 342, 344 are cylindrical in shape. In other embodiments, the through-holes 342, 344 may be otherwise shaped.

Figure 8:
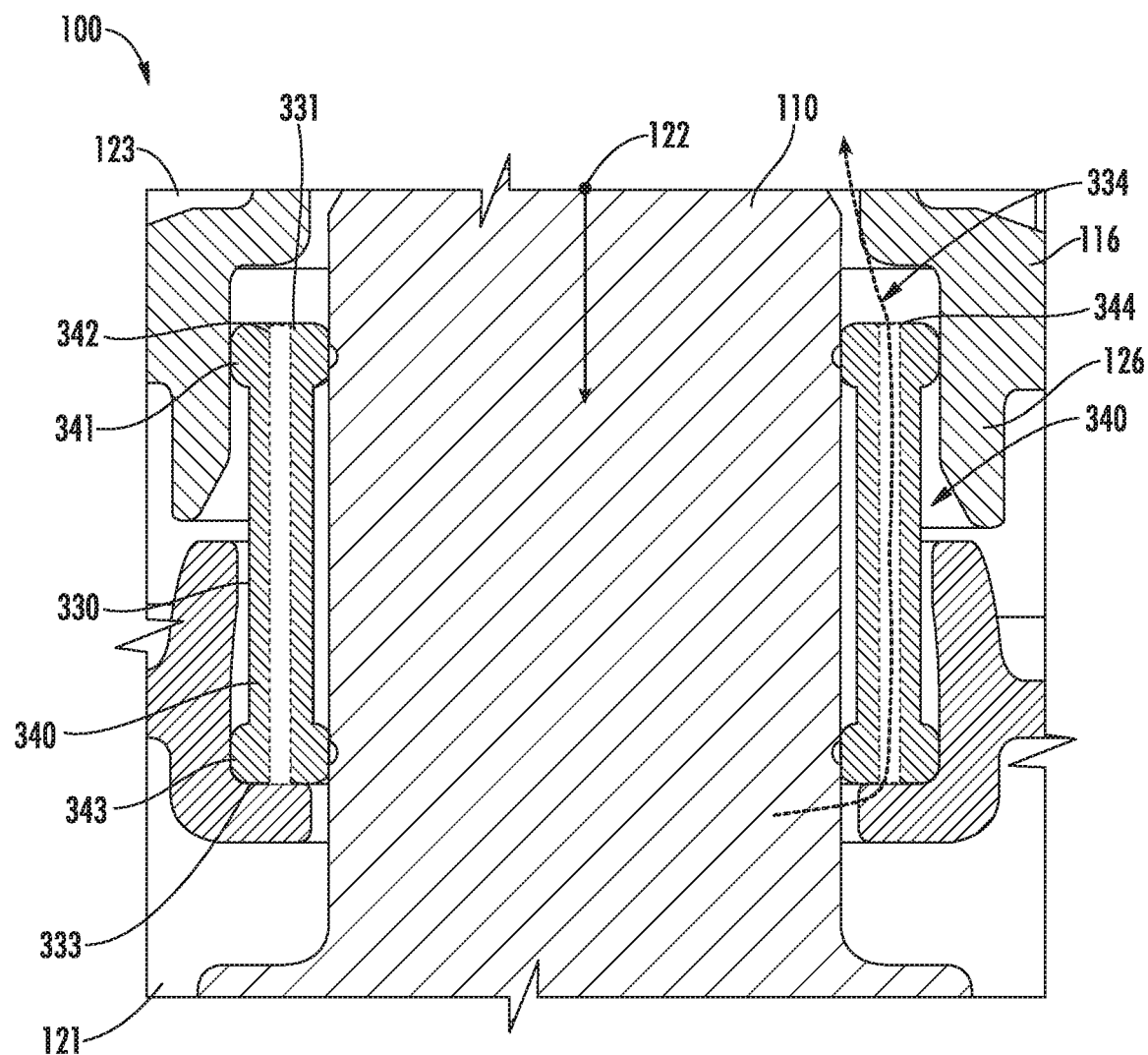
FIG. 8 shows a close-up cross-sectional view of the filter assembly of FIG. 1 including the gasket of FIG. 7.

FIG. 8 shows a close-up cross-sectional view of the filter assembly 100 near the cylindrical gasket 330. As shown, a portion of the outer surface 336 (e.g., at the top annular ring 341) interfaces with the annular tab portion 126 of the first endcap 116, while the inner surface 338 of the gasket 330 interfaces with the central tube 110. The air vent passages 340 formed by the through-holes 342, 344 pass longitudinally through the gasket 330 from the top surface 331 to the bottom surface 333. The air vent passages 340 allow for venting of air from the inner cavity 121 toward the opening 122 of the central tube 110. The air flows from the inner cavity 121 through the through-holes 342, 344 formed in the gasket 330 and toward the top surface 331 of the gasket 330, where the air flows out of the gasket 330 and toward the opening 122 of the central tube 110. Thus, in addition to the venting of air through the first endcap 116 as shown by outer side air flow arrow 124 in FIG. 1, venting as shown by inner side air flow arrow 334 (e.g., from the inner cavity 121, through the gasket 330 and toward opening 122) is also permitted. In this way, air that may be trapped within the inner cavity 121 is purged through the air vent passages 340.

Figure 9A:
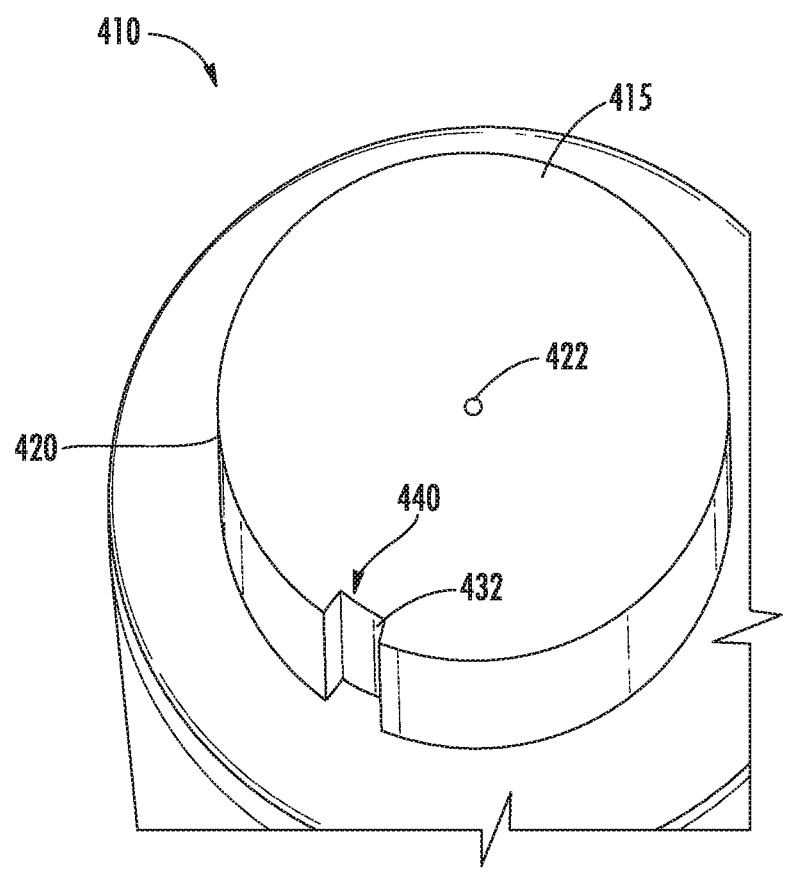
FIG. 9A shows a perspective view of a central tube of the filter assembly of FIG. 1 according to an example embodiment.
Figure 9B:
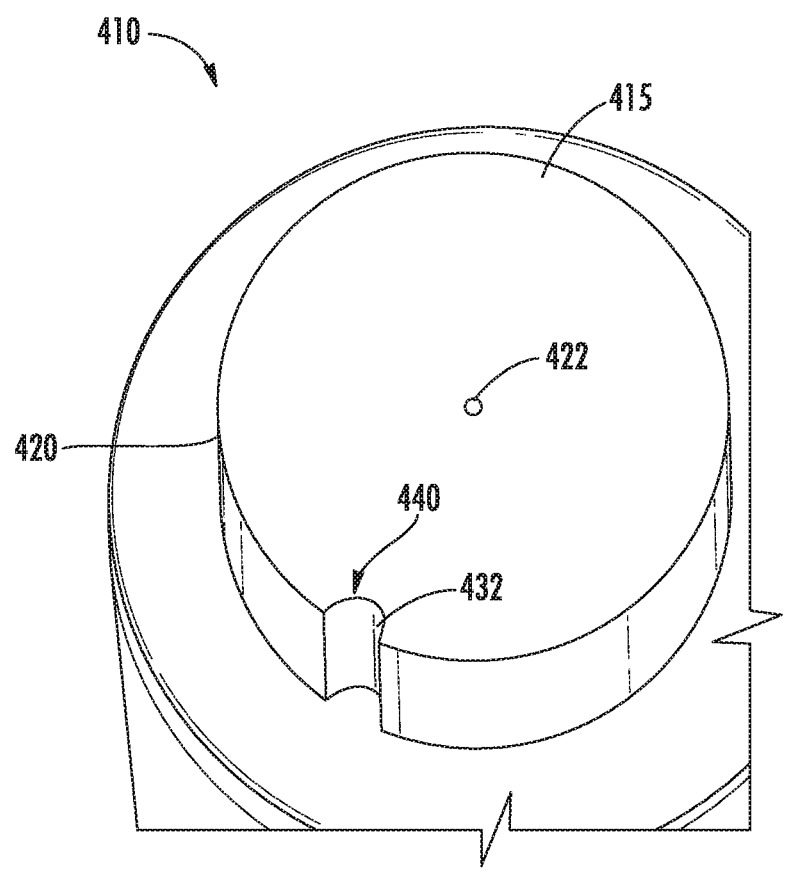
FIG. 9B shows a perspective view of a central tube of the filter assembly of FIG. 1 according to another example embodiment.

Referring to FIGS. 9A-9B, a central tube 410 is shown according to an example embodiment. The central tube 410 includes an outer surface 420 and a top surface 415. The central tube 410 includes a notch 432 (e.g., a slot, passage, channel) formed in the outer surface 420 extending a distance in toward the opening 122 of the central tube 410. The notch 432 forms an air vent passage 440. As shown in FIG. 9A, the notch 432 can be a rectangular notch 432 or as shown in FIG. 9B, the notch 432 can be a circular notch 432. In other embodiments, the notch 432 may be otherwise shaped.

Figure 10:
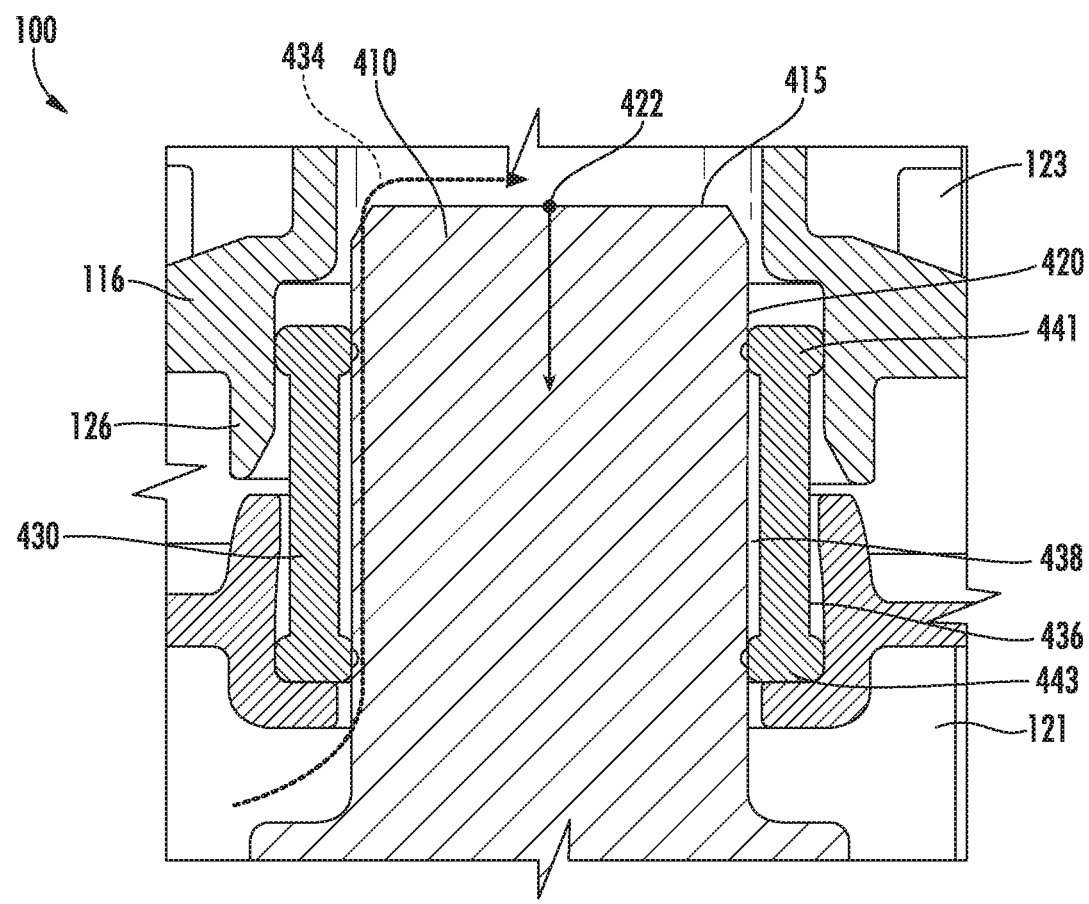
FIG. 10 shows a close-up cross-sectional view of the filter assembly of FIG. 1 including the central tube of FIGS. 9A-9B.

FIG. 10 shows a close-up cross-sectional view of the filter assembly 100 near the central tube 410 and cylindrical gasket 430. As shown, the outer surface 420 of the central tube 410 interfaces with a cylindrical gasket 430. The gasket 430 includes an inner surface 438, an outer surface 436, a top annular ring 441, and bottom annular ring 443. The outer surface 420 of the central tube 410 interfaces with the inner surface 438 of the gasket 430 and particularly with the inner side of the top annular ring 441 and bottom annular ring 443. In the embodiment shown in FIGS. 9A-10, the air vent passage 440 formed by the notch 432 in the central tube 410 allows for air within the inner cavity 121 to pass through the space between the gasket 430 and central tube 410. In this embodiment, no modification to the gasket 430 is necessary to achieve the air vent passage 440. The air vent passage 440 allows for venting of air from the inner cavity 121 toward the opening 422 of the central tube 410. The air flows from the inner cavity 121 through the notch 432 formed in the central tube 410 and toward the top surface 415 of the central tube 410, where the air flows out of the notch 432 and toward the opening 422. Thus, in addition to the venting of air through the first endcap 116 as shown by outer side air flow arrow 124 in FIG. 2, venting as shown by inner side air flow arrow 434 (e.g., from the inner cavity 121, through the notch 432 in the central tube 410 and toward opening 422) is also permitted. In this way, air that may be trapped within the inner cavity 121 is purged through the air vent passage 440.

In some embodiments, instead of providing an air vent passage (e.g., air vent passages 140, 240, 340, 440), the gasket 130 is a porous gasket, which allows venting through a sealing surface of the gasket 130. As shown in FIG. 2, when used with a porous gasket, venting as shown by air flow arrow 137 (e.g., from the inner cavity 121 through the gasket 130 and toward opening 122) is established. In this way, air that may be trapped within the inner cavity 121 is purged through the porous gasket 130 as shown by arrow 137. At the same time, the porous gasket still serves a sealing function that prevents liquid (e.g., fuel) from passing through. The porous gasket can be made from various materials and can be configured to react to a functional porosity (e.g., leakage) as a function of temperature, material, swell, etc. In some embodiments, the gasket 130 includes a number of holes or voids allowing air to vent from the inner cavity toward the opening 122 in the central tube 110. For example, a sintered metal filter (e.g., stainless steel filter) may be used to provide a degree of porosity (e.g., measured in pores per cubic inch (PPI)) to allow air to escape through pores in the wall thickness of the filter. As another example, the gasket 130 is made from a felt material. In some embodiments, the gasket 130 can be configured to deform under compression to seal any gaps as necessary and incorporate a swell factor to reduce the pore size in the material of the gasket, while still allowing air to vent through. The material (e.g., material type, composition, PPI, density variation, etc.) of the gasket may be selected and tailor fit based on the venting requirements of the application.

Although the above-described filter assembly is described as being a fuel filter assembly, the same gasket and/or central tube arrangement may be applied in other filter assemblies. For example, the same gasket arrangement may be utilized in hydraulic fluid filtering systems, lubricant filtering systems, water filtering systems, and the like.

It should be noted that any use of the term "example" herein to describe various embodiments is intended to indicate that such embodiments are possible examples, representations, and/or illustrations of possible embodiments (and such term is not intended to connote that such embodiments are necessarily extraordinary or superlative examples).

As utilized herein, the term "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed (e.g., within plus or minus five percent of a given angle or other value) are considered to be within the scope of the invention as recited in the appended claims. The term "approximately" when used with respect to values means plus or minus five percent of the associated value.

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the figures. It should be noted that the orientation of various elements may differ according to other example embodiments, and that such variations are intended to be encompassed by the present disclosure.

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present invention.

What is claimed is:

1. A filter assembly comprising:
   a housing having an outer cavity and an inner cavity;
   a gasket disposed within the housing and comprising an inner surface, an outer surface, and a vent passage, the gasket configured to form a first seal with a central tube at the inner surface, the central tube extending into the inner cavity and having an opening; and
   a filter element positioned within the housing, the filter element comprising a filter media and an endcap, the filter media configured to filter a fluid, the endcap including an annular tab portion that forms a second seal with the outer surface of the gasket when the filter element is positioned in an operating position within the housing;
   wherein the vent passage circumvents the first seal and the second seal, allowing air to flow from the inner cavity of the housing to the opening in the central tube.

2. The filter assembly of claim 1, wherein the vent passage extends along the inner surface of the gasket between the gasket and the central tube.

3. The filter assembly of claim 1, wherein the vent passage extends from a bottom surface of the gasket to a top surface of the gasket.

4. The filter assembly of claim 1, wherein the vent passage extends along the outer surface of the gasket between the gasket and the endcap.

5. The filter assembly of claim 1, wherein the gasket further comprises:
   a top annular ring extending radially past the outer surface and the inner surface, the top annular ring having a horizontal slot extending therethrough; and
   a bottom annular ring extending radially past the outer surface and the inner surface, the bottom annular ring having a vertical slot extending therethrough.

6. The filter assembly of claim 5, wherein the horizontal slot extends through the top annular ring in a first direction substantially perpendicular to the outer surface and the vertical slot extends through the bottom annular ring in a second direction substantially parallel with the outer surface.

7. The filter assembly of claim 1, wherein the gasket is a porous gasket allowing air to flow from the inner cavity of the housing through the porous gasket and to the opening in the central tube.

8. The filter assembly of claim 7, wherein the porous gasket allows air to move therethrough and prevents liquid from flowing therethrough.

9. The filter assembly of claim 7, wherein the porous gasket is made from a sintered metal filter.

10. The filter assembly of claim 7, wherein the porous gasket comprises a felt material.

11. The filter assembly of claim 1, wherein the endcap seals a dirty side of the filter media from a clean side of the filter media, the endcap comprising an air vent passage extending therethrough configured to vent air through the endcap from the outer cavity.

12. A filter assembly comprising:
   a housing having an outer cavity and an inner cavity;
   a gasket disposed within the housing and configured to form a first seal with an outer surface of a central tube extending into the inner cavity, the central tube including an opening formed in a top surface and a vent passage formed on the outer surface; and
   a filter element positioned within the housing, the filter element comprising a filter media and an endcap, the filter media configured to filter a fluid, the endcap including an annular tab portion that forms a second seal with the gasket when the filter element is positioned in an operating position within the housing;
   wherein the vent passage circumvents the first seal and the second seal allowing air to flow from the inner cavity of the housing to the opening in the central tube.

13. The filter assembly of claim 12, wherein the vent passage is circular in cross-section.

14. The filter assembly of claim 12, wherein the vent passage is rectangular in cross-section.

15. The filter assembly of claim 12, wherein the endplate seals a dirty side of the filter media from a clean side of the filter media, the endcap comprising an air vent passage extending therethrough configured to vent air through the endcap from the outer cavity.

16. A filter assembly, comprising:
- a gasket comprising an inner surface, an outer surface, and a vent passage, the gasket configured to form a first seal with a central tube at the inner surface, the central tube extending into an inner cavity of a housing, the central tube having an opening; and
- a filter element comprising a filter media and an endcap, the filter media configured to filter a fluid, the endcap including an annular tab portion that forms a second seal with the outer surface of the gasket;
- wherein the vent passage circumvents the first seal and the second seal, allowing air to flow from the inner cavity of the housing to the opening in the central tube.

17. The filter assembly of claim 16, wherein the vent passage extends along the inner surface of the gasket between the gasket and the central tube.

18. The filter assembly of claim 16, wherein the vent passage extends from a bottom surface of the gasket to a top surface of the gasket.

19. The filter assembly of claim 16, wherein the vent passage extends along the outer surface of the gasket between the gasket and the endcap.

20. The filter assembly of claim 16, wherein the gasket is a porous gasket allowing air to flow from the inner cavity of the housing through the porous gasket and to the opening in the central tube.

21. A filter assembly comprising:
- a housing having an outer cavity and an inner cavity;
- a porous gasket disposed within the housing, the porous gasket surrounding and configured to seal with a central tube extending into the inner cavity, the central tube including an opening; and
- a filter element positioned within the housing, the filter element comprising a filter media and an endcap, the filter media configured to filter a fluid, the endcap sealed with the porous gasket when the filter element is positioned in an operating position within the housing;
- wherein the porous gasket allows air to flow from the inner cavity of the housing through the porous gasket and to the opening in the central tube.

* * * * *